3,020,144
HERBICIDAL COMPOSITION AND METHOD EMPLOYING N-CYANO AND N-CYANOALKYL SUBSTITUTED UREAS

Richard J. Gobeil and Raymond W. Luckenbaugh, Wilmington, Del., assignors to E. I. du Pont de Nemours and Company, Wilmington, Del., a corporation of Delaware
No Drawing. Filed Dec. 22, 1955, Ser. No. 554,617
7 Claims. (Cl. 71—2.6)

This invention relates to herbicidal compositions and methods; and more particularly, to such compositions and methods which employ as an essential herbicidal material a compound represented by the formula (1) 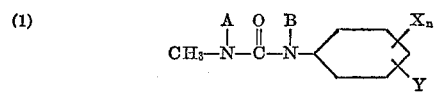

where one of the two ureido nitrogen substituents represented by the symbols A and B in the above formula is a cyano radical (—CN) or a cyanoalkyl radical containing 2 to 5 carbon atoms ($CNC_mH_{2m}$—, where $m$ is a positive integer less than 5) and the other of said ureido nitrogen substituents is hydrogen or an alkyl or alkenyl radical containing less than 6 carbon atoms; X and Y are selected from hydrogen, halogen, and alkyl containing less than 5 carbon atoms; and $n$ is a positive integer less than 3 (i.e., 1 or 2); the aromatic substituent having hydrogen on at least 1 of the nuclear carbons ortho to the nuclear carbon to which the urea nitrogen atom is linked.

In other words, the herbicidally active compounds of the compositions and methods of the invention are especially characterized by having a cyano or cyanoalkyl substituent on either one but not both, of the ureido nitrogen atoms. They are further characterized by having a methyl substituent on one of the ureido nitrogen atoms and a phenyl, halophenyl, alkylphenyl, or alkyl halophenyl substituent on the other ureido nitrogen atoms. For convenience, the class of tri- and tetra-substituted ureas defined and discussed above will be referred to hereinafter more briefly as cyano ureas.

The preferred halogen substituent in the cyano ureas is chlorine. The preferred alkyl or monovalent aliphatic radical substituent is methyl or ethyl, most preferably methyl.

Cyano ureas in which substituent A in Formula 1 above is a cyano alkyl radical and substituent B in that formula is hydrogen are conveniently prepared by reacting a phenyl isocyanate with a methyl cyanoalkyl amine in chemically equivalent amounts as indicated by Equation 2 below which illustrates the reaction with reference to specific reactants.

(2) 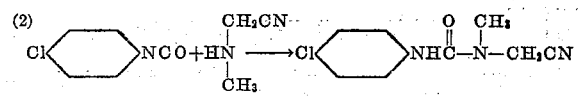

Cyano ureas in which the B substituent of Formula 1 above is an alkyl or alkenyl radical rather than hydrogen are prepared by the reaction of a substituted aniline with phosgene to form the corresponding carbamyl chloride, which is then reacted with a methyl cyanoalkyl amine. An acid acceptor such as trimethylamine is used. The following equations illustrate:

(3) 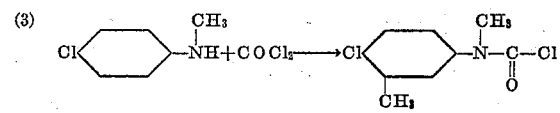

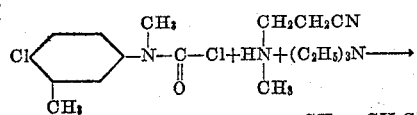

Cyano ureas in which substituent A in Formula 1 above is hydrogen and substituent B in that formula is a cyanoalkyl radical are conveniently prepared by reacting a methylisocyanate with N-alkylcyano substituted aniline. The following equation illustrates:

(4) 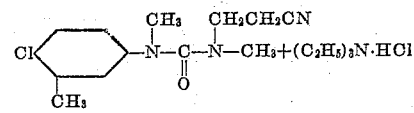

Cyano ureas in which substituent A in Formula 1 above is an alkyl or alkenyl radical rather than hydrogen and a cyanoalkyl radical is represented by B in that formula are prepared by reacting phosgene with N-cyanoalkyl substituted aniline to give the corresponding carbamyl chloride which is then reacted with a dialkyl amine or alkyl alkenyl amine in the presence of an acid acceptor such as triethylamine. The following equations illustrate:

(5) 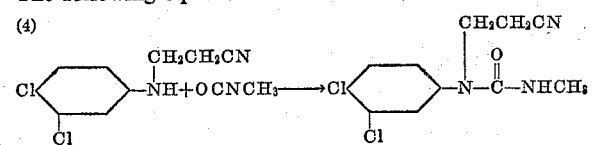

(5a) 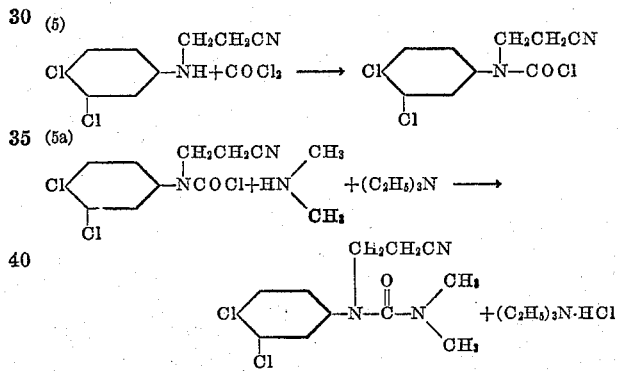

Cyano ureas in which the A substituent is an alkyl or alkenyl radical and the B substituent is a cyano radical are prepared by reacting a 1,1-dialiphatic-3-arylurea with sodium methoxide to obtain the sodium salt as illustrated in Equation 6 below and then reacting the product of that reaction with cyanogen chloride to give the desired cyano product as illustrated by the reaction shown in Equation 6a below:

(6)

(6a) 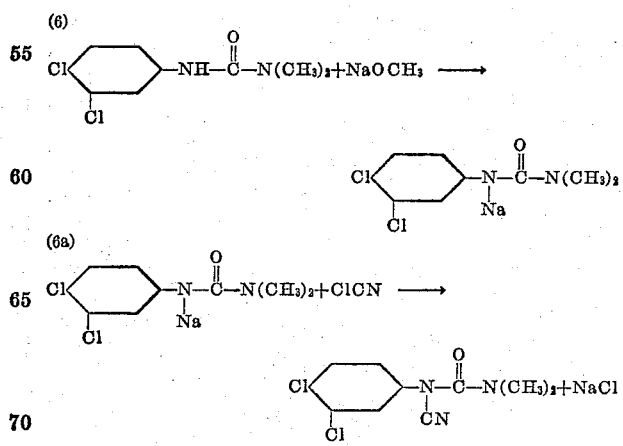

The reactions illustrated by Equations 2 and 4 above are preferably carried out in an inert solvent such as xylene, toluene, or dioxane. Such reaction is suitably carried out at a temperature in the range of about 15° to 75° C. No catalyst is needed.

In carrying out the process illustrated by Equations 3 and 5 above, the substituted aniline reactant in an inert solvent is added gradually to an excess of phosgene in an inert solvent. The resulting mixture is warmed slowly to reflux and refluxed until evolution of hydrogen chloride ceases. The process illustrated by Equations 3a and 5a proceeds readily at ordinary temperatures using equimolar amounts of the several reactants.

The reaction illustrated by Equation 6 is carried out in toluene under anhydrous conditions, followed by heating to remove by-product methanol by distillation. The reaction illustrated by Equation 6a is also carried out in toluene or other inert solvent and ordinarily proceeds at temperatures in the order of 50 to 70° C. No catalyst is needed.

Processes of the kind illustrated by the foregoing equations are described in detail in examples given hereinafter of the preparation of illustrative cyano ureas.

The cyano ureas employed in the herbicidal compositions and methods of the invention are generally crystalline solids. They are insoluble in water and moderately soluble in hydrocarbon solvents at room temperature. Generally, they have sharp melting points with no indication of decomposition.

Herbicidal compositions of the invention are prepared by admixing one or more of the cyano ureas defined heretofore, in herbicidally effective amounts, with a conditioning agent of the kind used and referred to in the art as a pest control adjuvant or modifier to provide formulations adapted for ready and efficient application to soil or weeds (i.e., unwanted plants) using conventional applicator equipment.

Thus the herbicidal compositions or formulations are prepared in the form of solids or liquids. Solid compositions are preferably in the form of dusts and are compounded to give homogeneous free-flowing dusts by admixing the active compound or compounds with finely divided solids, preferably talcs, natural clays, pyrophyllite, diatomaceous earth or flours such as walnut shell, wheat, redwood, soya bean, cottonseed flours and other inert solid conditioning agents or carriers of the kind conventionally employed in preparing pest control compositions in dust or powdered form.

Liquid compositions of the invention are prepared in the usual way be admixing one or more of the cyano ureas with a suitable liquid diluent media. With certain solvents such as alkylated naphthalene, dimethylformamide, and cresol, relatively high, up to about 35% by weight or more, concentrations of the cyano ureas can be obtained in solution. Other liquids conventionally used in preparing liquid herbicidal compositions are for the most part less effective solvents.

The herbicidal compositions of the invention whether in the form of dusts or liquids preferably also include a surface-active agent of the kind sometimes referred to in the art as a wetting, dispersing or emulsifying agent. These agents which will be referred to hereinafter more simply as surface-active dispersing agents cause the compositions to be easily dispersed in water to give aqueous sprays which for the most part constitute a desirable composition for application.

The surface-active dispersing agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in detail in articles by McCutcheon in "Soap and Sanitary Chemicals," August, September, and October of 1949.

Generally the surface-active agent will not comprise more than about 5 to 15% by weight of the composition depending, of course, upon the particular surface-active agent, the system in which it is placed, and the result desired, and in certain compositions, the percentage will be 1% or less. Usually the minimum lower concentration will be 0.1%.

The herbicidal compositions are applied either as a spray or a dust to the locus or area to be protected from undesirable plant growth, commonly called weeds, i.e., plants growing where they are not wanted. Such application can be made directly upon the locus or area and the weeds thereon during the period of weed infestation in order to destroy the weeds but, if desired, the application can be made in advance of an anticipated weed infestation to prevent such infestation. Thus the compositions can be applied as aqueous foliar sprays but can also be applied as sprays directly to the surface of the soil. Alternatively, the dried powdered compositions can be dusted directly on the plants or on the soil.

The active compound is, of course, applied in amount sufficient to exert the desired herbicidal action. The amount of the active cyano urea compound present in the compositions as actually applied for destroying, preventing or controlling weeds will vary with the manner of application, the particular weeds for which control is sought, the purposes for which the application is being made, and like variables. In general, the herbicidal compositions as applied in the form of a spray or a dust will contain from about 0.5% to 85% by weight of a cyano urea or a combination of cyano ureas.

Fertilizer materials, other herbicidal agents, and other pest control agents such as insecticides and fungicides can be included in the herbicidal compositions of the invention if desired.

In order that the invention may be better understood, the following examples are given in addition to the examples already given above. The examples illustrate methods for making cyano ureas, herbicidal formulations employing such compounds, herbicidal applications, and the results obtained. Parts are by weight unless otherwise specified and the numbers following tabulated ingredients in the examples represent parts by weight of the ingredients in the combination shown in such tabulation.

*Example 1*

A total of 22 parts of methylaminoacetonitrile is added slowly to a solution of 37.4 parts of phenylisocyanate in about 175 parts of xylene while agitating and cooling to maintain the temperature at about 30° C. Agitation is continued for twenty minutes after completing addition of the methylaminoacetonitrile reactant. The white solid product formed in the process is then separated by filtration, washed, and dried. There is obtained in 93% yield 1-(cyanomethyl)-1-methyl-3-phenyl urea, M.P. 112–113° C.

*Analysis.*—Calc'd. for $C_{10}H_{11}N_3O$: N, 22.22%. Found: N, 22.06%.

The cyano urea compound prepared as above is formulated to provide a water dispersible powder adapted for dispersion in water for application as a herbicidal spray. The water dispersible powder composition is made by intimately mixing the ingredients listed below using conventional mixing or blending equipment and then grinding the mixture to give a powder having an average particle size less than about 50 microns.

| | |
|---|---|
| 1-(cyanomethyl)-1-methyl-3-phenylurea | 75 |
| Fuller's earth | 23.75 |
| Sodium lauryl sulfate, 50% (wetting agent) | 1 |
| Methyl cellulose, 15 cps. (dispersing agent) | 0.25 |
| | 100 |

The water dispersible powdered composition described above is dispersed in water to give an aqueous spray composition containing 0.6% by weight of the active cyano urea which is applied at a dosage of six pounds of said cyano urea per acre as a pre-emergence spray to crop land to prevent infestation of weed plants such as Johnson grass and broad leafed weeds.

Example 2

A total of 12.6 parts of β-cyanoethylmethylamine is added gradually over a period of 30 minutes to a solution of 17.9 parts of phenylisocyanate in 150 parts of xylene with agitation while cooling to maintain the temperature at 30–32° C. The product precipitated is removed by filtration, washed, and dried. There is obtained 1-(cyanoethyl)-1-methyl-3-phenylurea, M.P. 97–98° C.

The compound prepared as above is formulated in a dust composition adapted for direct application as a dust. The dust is made by blending or mixing the ingredients shown below and grinding the mix to give a composition having an average particle size less than about 50 microns.

| | |
|---|---|
| 1-(cyanoethyl)-1-methyl-3-phenylurea | 20 |
| Talc | 80 |
| | 100 |

The dust formulation of this example is applied using a conventional dusting apparatus at a dosage of 200 pounds per acre of the composition to a railroad right-of-way to kill and inhibit regrowth of weeds.

Example 3

A total of 17 parts of methylaminoacetonitrile is added gradually to a solution of 25.8 parts of m-tolyl isocyanate in 200 parts of benzene while agitating and cooling to maintain the temperature at about 35° C. Following addition of all the methylaminoacetonitrile reactant, the reaction mass is agitated for another hour and then is heated under vacuum to remove the solvent benzene.

There is obtained 43 parts of a viscous yellow oil which crystallizes on cooling to give a solid melting at 88.5–93° C. This product is recrystallized from benzene to give good quality 1-(cyanomethyl)-1-methyl-3-(m-tolyl) urea, M.P. 91.5–92.5° C.

*Analysis.*—Calc'd. for $C_{11}H_{13}N_3O$: N, 20.69%. Found: N, 20.46%.

The compound prepared as above is formulated in a powdered composition adapted for use in the preparation of a spray using either an oil, water, or a combination of oil and water as a liquid diluent. The powdered composition is made by conventional mixing and grinding operations.

| | |
|---|---|
| 1-(cyanomethyl)-1-methyl-3-(m-tolyl)urea | 70 |
| Alkylated aryl polyether alcohol (wetting and dispersing agent) | 4 |
| Fuller's earth | 26 |
| | 100 |

The dispersible powdered composition of this example is admixed with an oil and water to give a spray composition containing 1 part of the powdered composition, 80 parts of water, and 20 parts of an alkylated naphthalene oil. The resulting spray composition is applied at the rate of 100 gallons per acre to a field planted with corn, but prior to emergence of the corn, to control weed infestation of the area.

Example 4

3-(p-chlorophenyl)-1-(cyanomethyl)-1-methylurea is prepared following the procedure described in Example 3 by substituting 65 parts of methylaminoacetonitrile and 108 parts of p-chlorophenyl isocyanate for the nitrile and isocyanate reactants of Example 3. The 3-(p-chlorophenyl)-1-(cyanomethyl)-1-methylurea product of this example after recrystallization from alcohol had a melting point of 104.5–106.5° C.

*Analysis.*—Calc'd. for $C_{10}H_{10}ClN_3O$: Cl, 15.88%. Found: Cl, 15.77%.

The compound prepared as above is formulated in a liquid or fluid composition shown below by thoroughly mixing and dispersing the compound and the conditioning agents in the organic diluent.

| | |
|---|---|
| 3 - (p - chlorophenyl) - 1 - (cyanomethyl) - 1 - methylurea | 25 |
| Long chain fatty alcohol sulfate (emulsifying agent) | 2 |
| Goulac (dispersing agent) | 3 |
| Kerosene | 70 |
| | 100 |

The liquid formulation of this example is dispersed in water to give an aqueous emulsion of the composition containing 8% by weight of the cyano urea compound. This aqueous spray composition is sprayed on the area around oil storage tanks at a rate of 50 gallons per acre of the spray composition to destroy and control weeds.

Example 5

A total of 12.6 parts of β-cyanoethylmethylamine is added gradually to a solution of 20 parts of m-tolyl isocyanate in 250 parts of xylene with agitation while cooling to maintain the temperature at 25–30° C. After agitating the reaction mass for an additional hour, the precipitated product is filtered, washed, and dried. There is obtained 28.2 parts of white crystalline 1-(cyanoethyl)-1-methyl-3-(m-tolyl) urea, M.P. 100–102° C. Upon recrystallization from benzene, the compound was found to have a melting point of 101–102° C.

*Analysis.*—Calc'd. for $C_{12}H_{15}N_3O$: N, 19.35%. Found: N, 19.46%.

A granular herbicidal composition is obtained by mixing the compound obtained above in combination with the ingredients shown below with water to form a paste. The paste is then extruded, dried, and ground to give granules of size in the range of about ½₃₂ to ¼ inch diameter.

| | |
|---|---|
| 1-(cyanoethyl)-1-methyl-3-(m-tolyl)urea | 10 |
| Goulac (dispersing agent) | 3 |
| Hydrocarbon oil | 1 |
| Dextrin (binding agent) | 20 |
| Fuller's earth | 66 |
| | 100 |

The herbicidal composition of this example is applied at a rate of 20 pounds per acre of the granular formulation by means of a fertilizer spreader apparatus to a field planted with cotton seed, the application being made prior to emergence of the cotton plants, to control weed growth in the planted field.

Example 6

3-(p-chlorophenyl)-1-(cyanoethyl)-1-methylurea is obtained following the procedure of Example 5 by substituting p-chlorophenyl isocyanate for the m-tolyl isocyanate of that example. The product of the example is obtained in 76% yield, M.P. 135.5° C.

*Analysis.*—Calc'd. for $C_{11}H_{12}ClN_3O$: N, 17.68%. Found: N, 17.83%.

The compound of this example is formulated to provide a water dispersible powder adapted for dispersion in water for application as a herbicidal spray. The water dispersible powder composition is made by intimately mixing the ingredients listed below using conventional mixing or blending equipment and then grinding the mixture to give a powder having an average particle size less than about 50 microns.

| | |
|---|---:|
| 3-(p-chlorophenyl)-1-(cyanoethyl)-1-methylurea | 80 |
| Sodium disulfonate of dibutyl phenylphenol (wetting and dispersing agent) | 2 |
| Bentonite | 18 |
| | 100 |

The water dispersible powdered composition described above is dispersed in water to give an aqueous spray composition containing 0.6% by weight of the active cyano urea which is applied at a dosage of 6 pounds of said cyano urea per acre as a pre-emergence spray to crop land planted with corn to prevent infestation of the planted area with broad leafed weeds and grasses.

Example 7

46.6 parts of 3-(3,4-dichlorophenyl)-1,1-dimethyl urea and 600 parts of toluene are charged into a vessel equipped with an agitator and a packed column. This mixture is heated to distill material until a constant head temperature is reached indicating removal of all water. After cooling the mixture to room temperature, 10.8 parts of sodium methylate was added and the mixture distilled again until a constant boiling point is reached.

After cooling the undistilled liquid to 50° C. the column was replaced with a water condenser, and 21.2 parts of cyanogen bromide is added thereto in two equal parts while agitating. The reaction is exothermic and the reaction is carried out under reflux conditions. After stirring for 4 hours at 50–55° C., the mixture is filtered. The toluene is evaporated from the filtrate; the residue dissolved in ether, washed with water, and dried.

There is obtained 19.7 parts of crude 1-cyano-1-(3,4-dichlorophenyl)-3,3-dimethylurea, $n_D^{27.5}$ 1.5857. This product is crystallized from a mixture of ether and methanol and melts at 70–73° C.

The compound prepared as above is formulated in a dust composition adapted for direct application as a dust. The dust is made by blending or mixing the ingredients shown below and grinding the mix to give a composition having an average particle size less than about 50 microns.

| | |
|---|---:|
| 1-cyano-1-(3,4-dichlorophenyl)-3,3-dimethylurea | 5 |
| Cottonseed oil | 4 |
| Walnut shell flour | 91 |
| | 100 |

The dust formulation of this example is applied using a conventional dusting apparatus at a dosage of 20 pounds per acre of the cyano urea to prevent growth of weeds for an extended period.

Example 8

3,4-dichlorophenylisocyanate is reacted with methylaminoacetonitrile in xylene at about 30° C. by slowly adding the nitrile reactant to the isocyanate reactant. Agitation is continued for about 20 minutes after completing addition of the nitrile reactant. White solid 1-(cyanomethyl)-1-methyl-3-(3,4-dichlorophenyl)urea is recovered by filtration, washed, and dried.

The compound prepared as above is formulated in a powdered composition adapted for use in the preparation of a spray using either an oil, water, or a combination of oil and water as a liquid diluent. The powdered composition is made by conventional mixing and grinding operations.

| | |
|---|---:|
| 1-(cyanomethyl) - 1 - methyl - 3-(3,4-dichlorophenyl)urea | 80 |
| Ethylene oxide stearate-laurate (emulsifying agent) | 4 |
| Pyrophyllite | 16 |
| | 100 |

The dispersible formulation described above is dispersed in water to give a spray composition containing one pound of the above formulation for each 40 gallons of water. This spray composition is applied to a field planted with cottonseed at a rate of 3 pounds per acre of the cyano urea compound per acre, the application being made prior to emergence of the cotton plants, to control weed growth in the planted field.

Example 9 p-Isopropylphenylisocyanate is reacted with methylaminoacetonitrile in xylene at about 30° C. by slowly adding the nitrile reactant to the isocyanate reactant. Agitation is continued for about 20 minutes after completing addition of the nitrile reactant. White solid 1-(cyanomethyl)-3-(p-isopropylphenyl)-1-methylurea is recovered by filtration, washed, and dried.

The compound prepared as above is formulated in a liquid or fluid composition shown below by thoroughly mixing and dispersing the compound and the conditioning agents in the organic diluent.

| | |
|---|---:|
| 1-(cyanomethyl) - 3 - (p-isopropylphenyl) - 1-methylurea | 30 |
| Alkylated aryl polyether alcohol (wetting and emulsifying agent) | 3 |
| Methyl cellulose (dispersing agent) | 1 |
| Kerosene | 66 |
| | 100 |

The liquid formulation described above is diluted with kerosene to give a solution containing 5% by weight of the cyano urea. This diluted solution is sprayed over a railroad siding area at the rate of about 50 gallons of the solution per acre to free the area of weeds.

Example 10

3,4-xylylisocyanate is reacted with methylaminoacetonitrile in xylene at about 30° C. by slowly adding the nitrile reactant to the isocyanate reactant. Agitation is continued for about 20 minutes after completing addition of the nitrile reactant. White solid 1-(cyanomethyl)-1-methyl-3-(3,4-xylyl)urea is recovered by filtration, washed and dried.

A granular herbicidal composition is obtained by mixing the compound obtained above in combination with the ingredients shown below with water to form a paste. The paste is then extruded, dried, and ground to give granules of size in the range of about 1/32 to 1/4 inch diameter.

| | |
|---|---:|
| 1-(cyanomethyl)-1-methyl-3-(3,4-xylyl)urea | 7 |
| Goulac | 3 |
| Refined kerosene | 1 |
| Gelatin | 25 |
| Talc | 64 |
| | 100 |

The herbicidal composition of this example is applied at a rate of 25 pounds per acre of the granular formulation by means of a fertilizer spreader apparatus to a field planted with corn seed, the application being made prior to emergence of the corn plants, to control weed growth in the planted field.

Example 11

3,4-dichlorophenylisocyanate is reacted with β-cyanoethylmethylamine in equimolar amounts in xylene with agitation while cooling to maintain the temperature at about 30° C. In carrying out this process, the amine reactant is added gradually to the isocyanate reactant in the xylene. The crystalline product 1-(cyanoethyl)-1-methyl-3-(3,4-dichlorophenyl)urea is removed by filtration, washed, and dried.

The compound of this example is formulated to provide a water dispersible powder adapted for dispersion in water for application as a herbicidal spray. The water dispersible powder composition is made by intimately mixing the ingredients listed below using conventional mixing or blending equipment and then grinding the mixture to give a powder having an average particle size less than about 50 microns.

| | |
|---|---|
| 1-cyanoethyl)-1-methyl-3-(3,4-dichlorophenyl)urea | 95 |
| Sulfonated petroleum oil (surface active dispersing agent) | 5 |
| | 100 |

The concentrated dust formulation described above is added to water to give a spray composition containing 1 pound of the formulation for each 50 gallons of water. This aqueous spray is applied to a drainage ditch at the rate of 30 pounds of the cyano urea per acre to control unwanted plant growth in and around the drainage ditch.

*Example 12* m-Tolylisocyanate is reacted with β-cyanopropylmethylamine in equimolar amounts in xylene with agitation while cooling to maintain the temperature at about 30° C. In carrying out this process, the amine reactant is added gradually to the isocyanate reactant in the xylene. The crystalline product 1-(2-cyanopropyl)-1-methyl-3-m-tolylurea is removed by filtration, washed, and dried.

The compound prepared as above is formulated in a dust composition adapted for direct application as a dust. The dust is made by blending or mixing the ingredients shown below and grinding the mix to give a composition having an average particle size less than about 50 microns.

| | |
|---|---|
| 1-(2-cyanopropyl)-1-methyl-3-p-tolylurea | 20 |
| Talc | 80 |
| | 100 |

The dust formulation of this example is applied using a conventional dusting apparatus at a dosage of 200 pounds per acre of the composition to a railroad siding area to kill and inhibit regrowth of weeds.

*Example 13*

Methylisocyanate is reacted with β-cyanoethyl-3,4-dichloroaniline in equimolar amounts in xylene with agitation while cooling to maintain the temperature at about 30° C. In carrying out this process, the amine reactant is added gradually to the isocyanate reactant in the xylene. The crystalline product 1-(2-cyanoethyl)-1-(3,4-dichlorophenyl)-3-methylurea is removed by filtration, washed, and dried.

The compound prepared as above is formulated in a powdered composition adapted for use in the preparation of a spray using either an oil, water, or a combination of oil and water as a liquid diluent. The powdered composition is made by conventional mixing and grinding operations.

| | |
|---|---|
| 1-(2-cyanoethyl)-1-(3,4 - dichlorophenyl)-3-methylurea) | 70 |
| Alkylated aryl polyether alcohol (wetting and dispersing agent) | 4 |
| Fuller's earth | 26 |
| | 100 |

The dispersible powdered composition of this example is admixed with water in the proportion of 1 pound of the formulation for each 10 gallons of water, the resulting spray composition is applied at a rate of 100 gallons per acre to a field planted with corn, the application being made prior to emergence of the corn plants to control weed infestation of the corn field.

*Example 14*

Methylisocyanate is reacted with N-β-cyanoethylaniline in equimolar amounts in xylene with agitation while cooling to maintain the temperature at about 30° C. In carrying out this process, the amine reactant is added gradually to the isocyanate reactant in the xylene. The crystalline product 1-methyl-3-(2-cyanoethyl)-3-phenylurea is recovered by filtration, washed and dried.

The compound prepared as above is formulated in a liquid or fluid composition shown below by thoroughly mixing and dispersing the compound and the conditioning agents in the organic diluent.

| | |
|---|---|
| 1-methyl-3-(2-cyanoethyl)-3-phenylurea | 25 |
| Long chain fatty alcohol sulfate (emulsifying agent) | 2 |
| Goulac (dispersing agent) | 3 |
| Kerosene | 70 |
| | 100 |

The liquid formulation of this example is dispersed in water to give an aqueous emulsion of the composition containing 80% by weight of the cyano urea compound. This aqueous spray composition is sprayed on the area around oil storage tanks at the rate of about 50 gallons of the spray composition per acre to destroy and control weeds.

*Example 15*

N-methylcarbanilyl chloride is reacted with an equimolar amount of methylaminoacetontrile in the presence of an equimolar amount of triethylamine at 25° C. in xylene, the nitrile reactant being added gradually to the carbamyl chloride reactant. The reaction mass is stirred for 2 hours and filtered to remove the precipitated triethylamine hydrochloride. The filtrate is heated to remove the xylene solvent and leave as a dry product 1-(cyanomethyl)-1,3-dimethyl-3-phenylurea.

A granular herbicidal composition is obtained by mixing the compound obtained above in combination with the ingredients shown below with water to form a paste. The paste is then extruded, dried, and ground to give granules of size in the range of about 1/32 to 1/4 inch diameter.

| | |
|---|---|
| 1-(cyanomethyl)-1,3-dimethyl-3-phenylurea | 10 |
| Goulac (dispersing agent) | 3 |
| Hydrocarbon oil | 1 |
| Dextrin (binding agent) | 20 |
| Fuller's earth | 66 |
| | 100 |

The herbicidal composition of this example is applied at a rate of 20 pounds per acre of the granular formulation by means of a fertilizer spreader apparatus to a field planted with cotton seed, the application being made prior to emergence of the cotton plants, to control weed growth in the planted field.

*Example 16*

N-methylcarbanilyl chloride is reacted with an equimolar amount of β-cyanoethylmethylamine in the presence of an equimolar amount of triethylamine at 25° C. in xylene, the amine reactant being added gradually to the carbamyl chloride reactant. The reaction mass is stirred for 2 hours and filtered to remove the precipitated triethylamine hydrochloride. The filtrate is heated to remove the xylene solvent and leave as a dry product 1-(cyanoethyl)-1,3-dimethyl-3-phenylurea.

The cyano urea compound prepared as above is formulated to provide a water dispersible powder adapted for dispersion in water for application as a herbicidal spray. The water dispersible powder composition is made by intimately mixing the ingredients listed below using conventional mixing or blending equipment and then grinding the mixture to give a powder having an average particle size less than about 50 microns.

| | |
|---|---|
| 1-(cyanoethyl)-1,3-dimethyl-3-phenylurea | 75 |
| Fuller's earth | 23.75 |
| Sodium lauryl sulfate, 50% (wetting agent) | 1 |
| Methyl cellulose, 15 cps. (dispersing agent) | 0.25 |
| | 100 |

The water dispersible powdered composition described above is dispersed in water to give an aqueous spray composition containing 0.6% by weight of the active cyano urea which is applied at a dosage of six pounds of said cyano urea per acre as a pre-emergence spray to crop land to prevent infestation of weed plants such as Johnson grass and broad leafed weeds.

*Example 17*

N-methyl-3,4-dichlorocarbanilyl chloride is reacted with an equimolar amount of methylaminoacetonitrile in the presence of an equimolar amount of triethylamine at 25° C. in xylene, the nitrile reactant being added gradually to the carbamyl chloride reactant. The reaction mass is stirred for 2 hours and filtered to remove the precipitated triethylamine hydrochloride. The filtrate is heated to remove the xylene solvent and leave as a dry product 1-(cyanomethyl)-3-(3,4-dichlorophenyl)-1,3-dimethylurea.

The compound prepared as above is formulated in a dust composition adapted for direct application as a dust. The dust is made by blending or mixing the ingredients shown below and grinding the mix to give a composition having an average particle size less than about 50 microns.

| | |
|---|---|
| 1-(cyanomethyl) - 3 - (3,4-dichlorophenyl)-1,3-dimethylurea | 20 |
| Talc | 80 |
| | 100 |

The dust formulation of this example is applied using a conventional dusting apparatus at a dosage of 200 pounds per acre of the composition to a railroad right-of-way to kill and inhibit regrowth of weeds.

*Example 18*

N-β-cyanoethylcarbanilyl chloride is reacted with an equimolar amount of dimethylamine in the presence of an equimolar amount of triethylamine at 25° C. in xylene, the amine reactant being added gradually to the carbamyl chloride reactant. The reaction mass is stirred for 2 hours and filtered to remove the precipitated triethylamine hydrochloride. The filtrate is heated to remove the xylene solvent and leave as a dry product 1-(cyanoethyl)-3,3-dimethyl-1-phenylurea.

The compound prepared as above is formulated in a powdered composition adapted for use in the preparation of a spray using either an oil, water, or a combination of oil and water as a liquid diluent. The powdered composition is made by conventional mixing and grinding operations.

| | |
|---|---|
| 1-(cyanoethyl)-3,3-dimethyl-1-phenylurea | 70 |
| Alkylated aryl polyether alcohol (wetting and dispersing agent) | 4 |
| Fuller's earth | 26 |
| | 100 |

The dispersible powdered composition of this example is admixed with an oil and water to give a spray composition containing 1 part of the powdered composition, 80 parts of water, and 20 parts of an alkylated naphthalene oil. The resulting spray composition is applied at the rate of 100 gallons per acre to a field planted with corn, but prior to emergence of the corn, to control weed infestation of the area.

*Example 19*

N-β-cyanoethyl-3,4-dichlorocarbanilyl chloride is reacted with an equimolar amount of dimethylamine in the presence of an equimolar amount of triethylamine at 25° C. in xylene, the amine reactant being added gradually to the carbamyl chloride reactant. The reaction mass is stirred for 2 hours and filtered to remove the precipitated triethylamine hydrochloride. The filtrate is heated to remove the xylene solvent and leave as a dry product 1-(cyanoethyl)-1-(3,4-dichlorophenyl)-3,3-dimethylurea.

The compound prepared as above is formulated in a liquid or fluid composition shown below by thoroughly mixing and dispersing the compound and the conditioning agents in the organic diluent.

| | |
|---|---|
| 1-(cyanoethyl)-1-(3,4-dichlorophenyl)-3,3-dimethylurea | 25 |
| Long chain fatty alcohol sulfate (emulsifying agent) | 2 |
| Goulac (dispersing agent) | 3 |
| Kerosene | 70 |
| | 100 |

The liquid formulation of this example is dispersed in water to give an aqueous emulsion of the composition containing 8% by weight of the cyano urea compound. This aqueous spray composition is sprayed on the area around oil storage tanks at a rate of 50 gallons per acre of the spray composition to destroy and control weeds.

*Example 20*

1,1-dimethyl-3-phenylurea is reacted with sodium methylate under anhydrous conditions in xylene at about room temperature and then heated to remove by-product methanol by distillation.

Cyanogen bromide is added to the undistilled residue with agitation in amount corresponding to one mol of cyanogen bromide for each mol of the 1,1-dimethyl-3-phenylurea at about 70° C. and then the reaction mass is agitated for an additional 4 hours at about 50 to 55° C. and then cooled and filtered. The toluene solvent is distilled from the filtrate to leave as a residue the product 1-cyano-3,3-dimethyl-1-phenylurea.

A granular herbicidal composition is obtained by mixing the compound obtained above in combination with the ingredients shown below with water to form a paste. The paste is then extruded, dried, and ground to give granules of size in the range of about 1/32 to 1/4 inch diameter.

| | |
|---|---|
| 1-cyano-3,3-dimethyl-1-phenylurea | 10 |
| Goulac (dispersing agent) | 3 |
| Hydrocarbon oil | 1 |
| Dextrin (binding agent) | 20 |
| Fuller's earth | 66 |
| | 100 |

The herbicidal composition of this example is applied at a rate of 20 pounds per acre of the granular formulation by means of a fertilizer spreader apparatus to a field planted with cotton seed, the application being made prior to emergence of the cotton plants, to control weed growth in the planted field.

*Example 21* m-Chlorophenylisocyanate is reacted with an equimolar amount of methylaminoacetonitrile in xylene at about 30° C., the nitrile reactant being added slowly to the isocyanate reactant. Agitation is continued for about 20 minutes after completing the addition of the nitrile reactant. The while solid product of the reaction, 3-(m-chlorophenyl)-1-cyanomethyl-1-methylurea, is obtained by filtration of the reaction mass and is purified by washing and drying.

The compound of this example is formulated to provide a water dispersible powder adapted for dispersion in water for application as a herbicidal spray. The water dispersible powder composition is made by intimately mixing the ingredients listed below using conventional mixing or blending equipment and then grinding the mixture to give a powder having an average particle size less than about 50 microns.

| | |
|---|---|
| 3-(m-chlorophenyl)-1-cyanomethyl-1-methylurea | 80 |
| Sodium disulfonate of dibutyl phenylphenol (wetting and dispersing agent) | 2 |
| Bentonite | 18 |
| | 100 |

The water dispersible powdered composition described above is dispersed in water to give an aqueous spray composition containing 0.6% by weight of the active cyano urea which is applied at a dosage of 6 pounds of said cyano urea per acre as a pre-emergence spray to crop land planted with corn to prevent infestation of the planted area with broad leafed weeds and grasses.

*Example 22*

3-chloro-p-tolylisocyanate is reacted with an equimolar amount of methylaminoacetonitrile in xylene at about 30° C., the nitrile reactant being added slowly to the isocyanate reactant. Agitation is continued for about 20 minutes after completing the addition of the nitrile reactant. The white solid product of the reaction, 3-(3-chloro-p-tolyl)-1-(cyanomethyl)-1-methylurea, is obtained by filtration of the reaction mass and is purified by washing and drying.

The compound prepared as above is formulated in a dust composition adapted for direct application as a dust. The dust is made by blending or mixing the ingredients shown below and grinding the mix to give a composition having an average particle size less than about 50 microns.

| | |
|---|---|
| 3-(3-chloro-p-tolyl)-1-(cyanomethyl)-1-methylurea | 5 |
| Cottonseed oil | 4 |
| Walnut shell flour | 91 |
| | 100 |

The dust formulation of this example is applied using a conventional dusting apparatus at a dosage of 20 pounds per acre of the cyano urea to prevent growth of weeds for an extended period.

*Example 23* p-Bromophenylisocyanate is reacted with an equimolar amount of methylaminoacetonitrile in xylene at about 30° C., the nitrile reactant being added slowly to the isocyanate reactant. Agitation is continued for about 20 minutes after completing the addition of the nitrile reactant. The white solid product of the reaction, 3-(p-bromophenyl)-1-(cyanomethyl)-1-methylurea, is obtained by filtration of the reaction mass and is purified by washing and drying.

The compound prepared as above is formulated in a powdered composition adapted for use in the preparation of a spray using either an oil, water, or a combination of oil and water as a liquid diluent. The powdered composition is made by conventional mixing and grinding operations.

| | |
|---|---|
| 3-(p-bromophenyl)-1-(cyanomethyl)-1-methylurea | 80 |
| Ethylene oxide stearate-laurate (emulsifying agent) | 4 |
| Pyrophyllite | 16 |
| | 100 |

The dispersible formulation described above is dispersed in water to give a spray composition containing one pound of the above formulation for each 40 gallons of water. This spray composition is applied to a field planted with cottonseed at a rate of 3 pounds per acre of the cyano urea compound per acre, the application being made prior to emergence of the cotton plants, to control weed growth in the planted field.

*Example 24* p-Fluorophenylisocyanate is reacted with an equimolar amount of methylaminoacetonitrile in xylene at about 30° C., the nitrile reactant being added slowly to the isocyanate reactant. Agitation is continued for about 20 minutes after completing the addition of the nitrile reactant. The white solid product of the reaction, 1-cyanomethyl)-3-(p-fluorophenyl)-1-methylurea, is obtained by filtration of the reaction mass and is purified by washing and drying.

The compound prepared as above is formulated in a liquid or fluid composition shown below by thoroughly mixing and dispersing the compound and the conditioning agents in the organic diluent.

| | |
|---|---|
| 1-(cyanomethyl)-3-(p-fluorophenyl)-1-methylurea | 30 |
| Alkylated aryl polyether alcohol (wetting and emulsifying agent) | 3 |
| Methyl cellulose (dispersing agent) | 1 |
| Kerosene | 66 |
| | 100 |

The liquid formulation described above is diluted with kerosene to give a solution containing 5% by weight of the cyano urea. This diluted solution is sprayed over a railroad siding area at the rate of about 50 gallons of the solution per acre to free the area of weeds.

*Example 25*

3,4-dichlorophenylisocyanate is reacted with an equimolar amount of N-methyl-4-cyanobutylamine in xylene at about 30° C., the amine reactant being added slowly to the isocyanate reactant. Agitation is continued for about 20 minutes after completing the addition of the nitrile reactant. The white solid product of the reaction, 1-4(4-cyanobutyl)-3-(3,4-dichlorophenyl)-1-methylurea, is obtained by filtration of the reaction mass and is purified by washing and drying.

A granular herbicidal composition is obtained by mixing the compound obtained above in combination with the ingredients shown below with water to form a paste. The paste is then extruded, dried, and ground to give granules of size in the range of about 1/32 to 1/4 inch diameter.

| | |
|---|---|
| 1-(4-cyanobutyl)-3-(3,4-dichlorophenyl)-1-methylurea | 7 |
| Goulac | 3 |
| Refined kerosene | 1 |
| Gelatin | 25 |
| Talc | 64 |
| | 100 |

The herbicidal composition of this example is applied at a rate of 25 pounds per acre of the granular formulation by means of a fertilizer spreader apparatus to a field planted with corn seed, the application being made prior to emergence of the corn plants, to control weed growth in the planted field.

*Example 26*

The sodium salt of 1-allyl-3-(3,4-dichlorophenyl)-1-methylurea is prepared by the procedure described in Example 7. 1-allyl-3-cyano-3-(3,4-dichlorophenyl)-1-methylurea is prepared from this salt by reaction with an equal molar quantity of cyanogen bromide as described in Example 7.

The compound prepared as above is formulated in a dust composition adapted for direct application as a dust. The dust is made by blending or mixing the ingredients shown below and grinding the mix to give a composition having an average particle size less than about 50 microns.

| 1-allyl-3-(3,4-dichlorophenyl)-1-methylurea | 5 |
|---|---|
| Cottonseed oil | 4 |
| Walnut shell flour | 91 |
| | 100 |

The dust formulation of this example is applied using a conventional dusting apparatus at a dosage of 20 pounds per acre of the cyano urea to prevent growth of weeds for an extended period.

*Example 27*

N-allylcarbanilyl chloride, which is prepared from equal molar quantities of N-allyl-aniline and phosgene, is reacted with an equal molar quantity of β-cyanoethyl-methylamine in xylene solution in the presence of an equimolar quantity of triethylamine at 25° C. After removal of the triethylamine hydrochloride by filtration, 1-allyl-3-(2-cyanoethyl)-3-methyl-1-phenylurea is isolated by removal of the solvent by evaporation.

The compound prepared as above is formulated in a liquid or fluid composition shown below by thoroughly mixing and dispersing the compound and the conditioning agents in the organic diluent.

| 1-allyl-3-(2-cyanoethyl)-3-methyl-1-phenylurea | 30 |
|---|---|
| Alkylated aryl polyether alcohol (wetting and emulsifying agent) | 3 |
| Methyl cellulose (dispersing agent) | 1 |
| Kerosene | 66 |
| | 100 |

The liquid formulation described above is diluted with kerosene to give a solution containing 5% by weight of the cyano urea. This diluted solution is sprayed over a railroad siding area at the rate of about 50 gallons of the solution per acre to free the area of weeds.

*Example 28*

By the procedure described in Example 27, N-(2-cyanoethyl) carbanilyl chloride is reacted with an equal molar quantity of N-allylmethylamine to yield 1-allyl-3-(2-cyanoethyl)-3-methyl-3-phenylurea.

The compound prepared as above is formulated in a liquid or fluid composition shown below by thoroughly mixing and dispersing the compound and the conditioning agents in the organic diluent.

| 1-allyl-3-(2-cyanoethyl)-3-methyl-3-phenylurea | 25 |
|---|---|
| Long chain fatty alcohol sulfate (emulsifying agent) | 2 |
| Goulac (dispersing agent) | 3 |
| Kerosene | 70 |
| | 100 |

The liquid formulation of this example is dispersed in water to give an aqueous emulsion of the composition containing 8% by weight of the cyano urea compound. This aqueous spray composition is sprayed on the area around oil storage tanks at a rate of 50 gallons per acre of the spray composition to destroy and control weeds.

*Example 29*

By the procedure described in Example 27, 1-allyl-3-(2-cyanoethyl)-1-(3,4-dichlorophenyl)-3-methylurea is prepared from N-(2-cyanoethyl)-3,4-dichlorocarbanilyl chloride and N-allylmethylamine.

The compound prepared as above is formulated in a liquid or fluid composition shown below by thoroughly mixing and dispersing the compound and the conditioning agents in the organic diluent.

| 1-allyl-3-(2-cyanoethyl)-1 - (3,4-dichlorophenyl) - 3-methylurea | 30 |
|---|---|
| Alkylated aryl polyether alcohol (wetting and emulsifying agent) | 3 |
| Methyl cellulose (dispersing agent) | 1 |
| Kerosene | 66 |
| | 100 |

The liquid formulation described above is diluted with kerosene to give a solution containing 5% by weight of the cyano urea. This diluted solution is sprayed over a railroad siding area at the rate of about 50 gallons of the solution per acre to free the area of weeds.

Other illustrative compounds which can be prepared according to methods described heretofore and can be formulated and used in herbicidal applications in the manner and for the purpose described in the foregoing examples are:

1-(cyanomethyl)-1-methyl-3-(p-tolyl)urea
3-(p-sec.butylphenyl)-1-(cyanomethyl)-1-methylurea
1-(2-cyanoethyl)-1-methyl-3-(p-tolyl)urea
1-(2-cyanoethyl)-3-(p-isopropylphenyl)-1-methylurea
1-(2-cyanoethyl)-1-methyl-3-(3,4-xylyl)urea
3-(p-chlorophenyl)-1-(cyanomethyl)-1,3-dimethylurea
3-(p-chlorophenyl)-1-(2-cyanoethyl)-1,3-dimethylurea
1-(p-chlorophenyl)-3-(2-cyanopropyl)-3-methylurea
1-(p-chlorophenyl)-1-(cyanomethyl)-3-methylurea
3-cyano-1-methyl-3-phenylurea
3-cyano-3-(3,4-dichlorophenyl)-1-methylurea
3-(m-chlorophenyl)-3-cyano-1-methylurea While the invention has been described with particular reference to specific embodiments, it will be appreciated that no unnecessary limitations are to be understood therefrom. The invention is not limited to the exact details shown and described for obvious modifications will occur to those skilled in the art.

This application is a continuation-in-part of application Serial No. 505,536, filed May 2, 1955, now abandoned.

We claim:

1. A method for the control of weeds which comprises applying to a locus to be protected, in amount sufficient to exert a herbicidal action, a compound represented by the formula

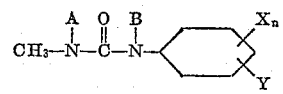

where one of the two substituents A and B is selected from the group consisting of cyano and cyano alkyl containing less than 6 carbon atoms and the other of said substituents is selected from the group consisting of hydrogen, alkyl containing less than 6 carbon atoms and alkenyl containing less than 6 carbon atoms; X and Y are selected from the group consisting of hydrogen, halogen, and alkyl of less than 5 carbon atoms; and $n$ is a positive integer less than 3; the aromatic substituent having hydrogen on at least one of the nuclear carbons ortho to the nuclear carbon to which the ureido nitrogen atom is linked.

2. A herbicidal composition comprising a material selected from the group consisting of anionic, cationic and non-ionic surface-active agents and, in amount sufficient to exert herbicidal action, a compound represented by the formula

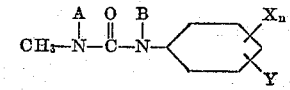

where one of the two substituents A and B is selected from the group consisting of cyano and cyano alkyl containing less than 6 carbon atoms and the other of said substituents is selected from the group consisting of hydrogen, alkyl containing less than 6 carbon atoms and alkenyl containing less than 6 carbon atoms; X and Y are selected from the group consisting of hydrogen, halogen, and alkyl of less than 5 carbon atoms, and $n$ is a positive integer less than 3; the aromatic substituent having hydrogen on at least one of the nuclear carbons ortho to the nuclear carbon to which the ureido nitrogen atom is linked.

3. A herbicidal composition comprising a material selected from the group consisting of anionic, cationic and non-ionic surface-active agents and, in amount sufficient to exert herbicidal action, the compound 1-cyano-1-phenyl-3,3-dimethylurea.

4. A herbicidal composition comprising a material selected from the group consisting of anionic, cationic and non-ionic surface-active agents and, in amount sufficient to exert herbicidal action, the compound 1-cyano-1-(3,4-dichlorophenyl)-3,3-dimethylurea.

5. A herbicidal composition comprising a material selected from the group consisting of anionic, cationic and non-ionic surface-active agents and, in amount sufficient to exert herbicidal action, the compound 1-cyanomethyl-1-methyl-3-phenylurea.

6. A herbicidal composition comprising a powdered solid inert carrier material and, in amount sufficient to exert herbicidal action, a compound represented by the formula

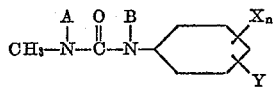

where one of the two substituents A and B is selected from the group consisting of cyano and cyano alkyl containing less than 6 carbon atoms and the other of said substituents is selected from the group consisting of hydrogen, alkyl containing less than 6 carbon atoms and alkenyl containing less than 6 carbon atoms; X and Y are selected from the group consisting of hydrogen, halogen, and alkyl of less than 5 carbon atoms; and $n$ is a positive integer less than 3; the aromatic substituent having hydrogen on at least one of the nuclear carbons ortho to the nuclear carbon to which the ureido nitrogen atom is linked.

7. A herbicidal composition comprising a hydrocarbon liquid diluent and, in amount sufficient to exert herbicidal action, a compound represented by the formula

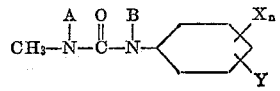

where one of the two substituents A and B is selected from the group consisting of cyano and cyano alkyl containing less than 6 carbon atoms and the other of said substituents is selected from the group consisting of hydrogen, alkyl containing less than 6 carbon atoms and alkenyl containing less than 6 carbon atoms; X and Y are selected from the group consisting of hydrogen, halogen, and alkyl of less than 5 carbon atoms; and $n$ is a positive integer less than 3; the aromatic substituent having hydrogen on at least one of the nuclear carbons ortho to the nuclear carbon to which the ureido nitrogen atom is linked.

References Cited in the file of this patent
UNITED STATES PATENTS

| | | |
|---|---|---|
| 2,472,347 | Sexton | June 7, 1949 |
| 2,655,445 | Todd | Oct. 13, 1953 |
| 2,667,411 | Mowry et al. | Jan. 26, 1954 |
| 2,704,245 | Searle | Mar. 15, 1955 |
| 2,705,195 | Cupery et al. | Mar. 29, 1955 |
| 2,709,648 | Ryker et al. | May 31, 1955 |
| 2,723,192 | Todd | Nov. 8, 1955 |
| 2,726,150 | Wolter | Dec. 6, 1955 |
| 2,749,232 | Ligett et al. | June 5, 1956 |
| 2,789,129 | Bissinger | Apr. 16, 1957 |

OTHER REFERENCES

Cook et al. in "Chemical Abstracts," vol. 74, cols. 8736 and 8737, 1953.